Sept. 25, 1934.   M. G. HUBBARD   1,974,676
COFFEE PERCOLATOR
Filed April 21, 1931   2 Sheets-Sheet 2
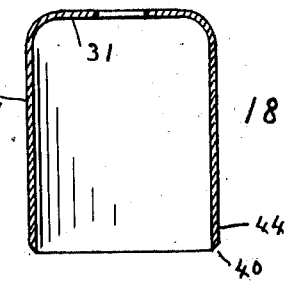
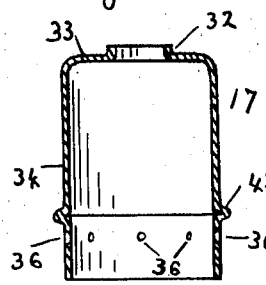
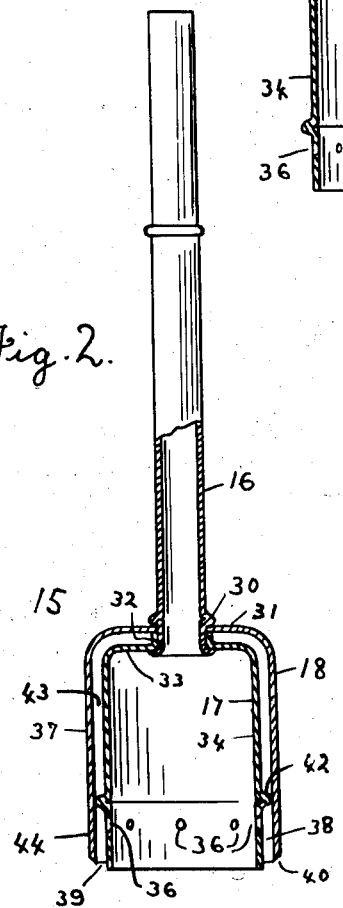
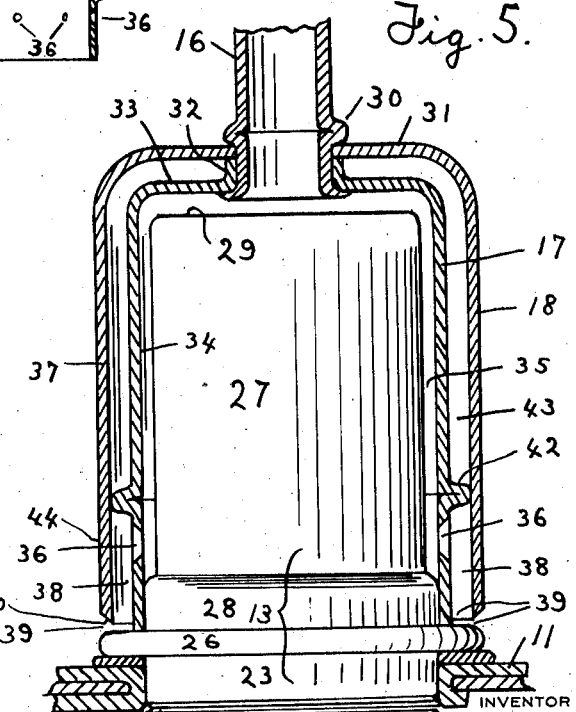

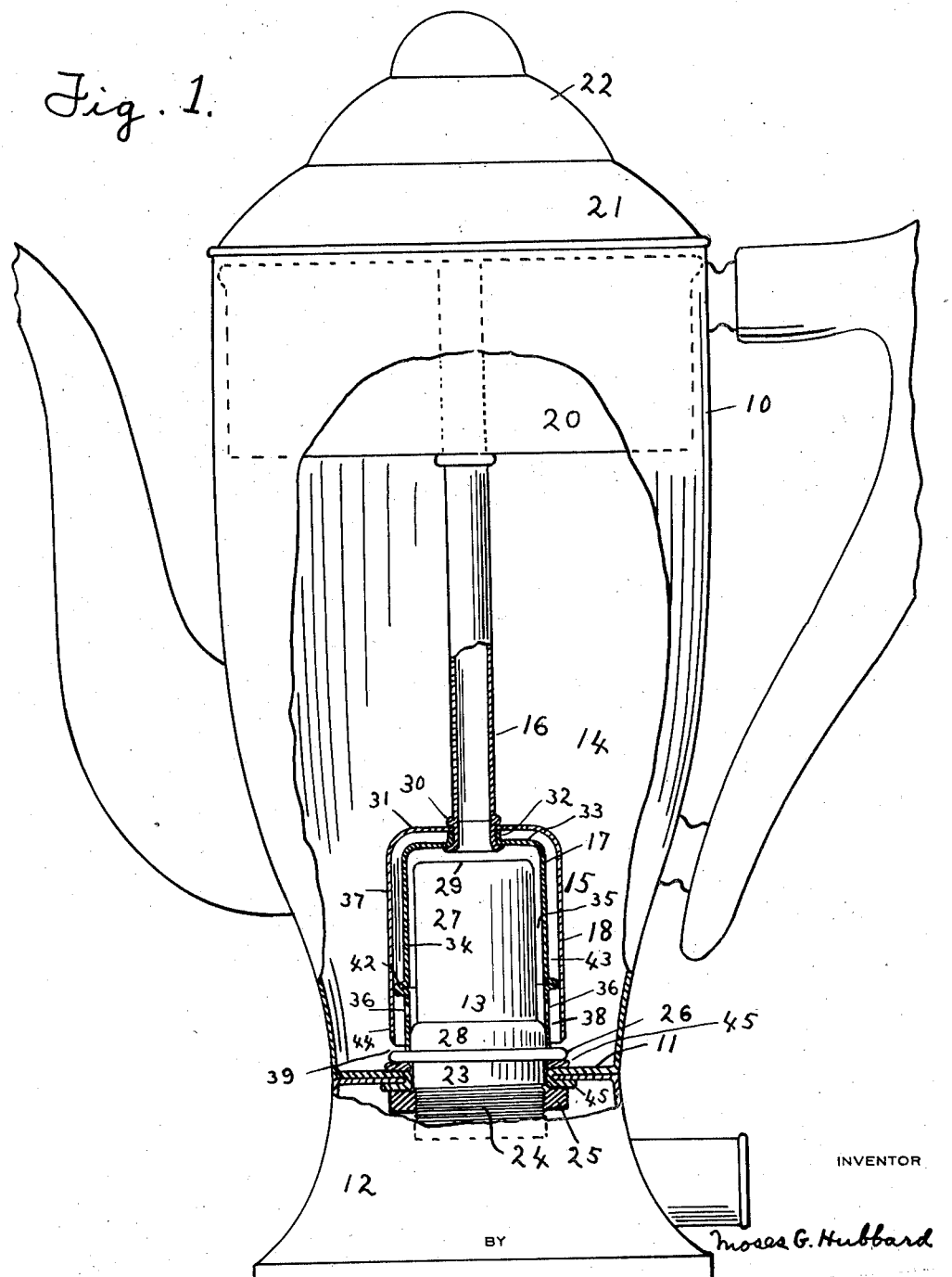

Patented Sept. 25, 1934

1,974,676

UNITED STATES PATENT OFFICE 1,974,676

COFFEE PERCOLATOR

Moses G. Hubbard, Utica, N. Y.

Application April 21, 1931, Serial No. 531,738

5 Claims. (Cl. 53—3)

This invention relates to coffee percolators and particularly to electrically-operated coffee percolators and more especially to the pump used with electric percolators.

The purpose of the present invention is to provide an electric coffee percolator and especially a pump structure for such electric percolators which percolator and pump are of new and improved form and particularly adapted to efficiently do the work required.

A further purpose of the invention is to provide an article of the class described wherein the pump is so formed and also is so combined with the other parts of the percolator that the pump action is improved in that the pumping action is made to operate at greatly increased capacity and with a negligible amount of back action through the pump, all resulting in a better operation of the pump and a speedier completion of the percolating process with a consequent saving in time of the operation, improvement in flavor of the coffee obtained and economy in electric current consumed.

Further purposes are to provide an article of the class described of such construction and arrangement and combination of its parts as will overcome the disadvantages heretofore found in electric coffee percolators and particularly in pumps used therewith and to obtain efficient co-operation between the pump and the electric heater.

In preparing coffee for a beverage by percolation I have found that the best results are obtained by letting the water first warm and subject the ground coffee to a preliminary treatment of warm vapor and then let the percolation start slowly so as to gradually saturate the coffee grounds with warm water and then to have the water gradually increase in temperature so that the grounds are kept constantly saturated with fairly hot water which expands the grounds and permits the soluble refreshing and delicious flavor to be carried away by the water into the main body of the liquid below and so gradually increase the strength of the infusion. Too much heat will greatly impair the flavor of the coffee produced and too little heat will not extract the flavor from the ground coffee. The main body of liquid should at all times be kept considerably below the boiling point. The heater should be capable of vaporizing the liquid quickly and the pump must be able to supply and carry away liquid much faster than the heater can vaporize it, resulting in a vaporization of a comparatively small amount of the liquid, that is just enough to create sufficient pressure to lift the liquid up through the delivery stem or tube and discharge it to the spreader over the basket containing the ground coffee. Any liquid that flows back from the pump through the inlet of the pump is not only a loss of efficiency in pumping action but causes the vaporization of too much liquid and discharges the liquid at too high a temperature, resulting in marked detriment to the finished beverage.

A general purpose of this invention is to produce an apparatus which obtains the desired operation and results above mentioned and avoids the disadvantages or objections above described. The structure pointed out in my invention is intended to impede any attempted back flow to a negligible minimum and cause any vapor pressure produced by the heater inside the pump shell to lift the liquid inside the shell up through the discharge stem and discharge the liquid into the spreader in ample volume and at moderate temperature thereby producing a finer flavored coffee beverage from any given brand of coffee and producing a greater quantity of given strength from a given amount of ground coffee in less time than any other percolator or percolator pump heretofore produced.

While I have shown my invention embodied in one form of percolator and in one form of pump, it will be understood that the illustration and description in detail thereof is for illustrative purposes only and that my invention is not limited to the detailed construction shown and described.

Fig. 1 is a vertical central sectional view through a coffee percolator wherein is embodied one form of my invention.

Fig. 2 is a vertical sectional view of the pump as a separate unit.

Fig. 3 is a vertical sectional view of the inner shell of the pump and Fig. 4 is a similar sectional view of the outer shell of the pump, both before the parts are assembled.

Fig. 5 is a detail vertical sectional view of the lower part of the pump and adjacent parts of the percolator shown on an enlarged scale in order to more clearly indicate the operation of the pump.

Referring to the drawings in a more particular description, it will be seen that the percolator here shown is of the electrically operated type and comprises a receptacle body 10 of usual form having the bottom 11 of the receptacle elevated a sufficient distance above the base or pedestal portion 12 of the body to allow of the installation and electrical connection of the electrical heater 13 which is mounted in the said body bottom 11 so that a part of it projects upward into the main receptacle or chamber 14 of the body 10. Fitted over and co-operating with the upwardly projecting heater 13 there is provided the pump designated as a unit by the numeral 15. This pump is comprised of an upright stem or tube 16, an inner shell 17 and preferably an outer shell 18. The liquid pumped up through the stem 16 is distributed over the ground coffee placed in the basket 20 supported at the top of the main receptacle of the percolator. The percolator has the usual cover 21 preferably having the conventional glass dome 22.

The electric heater 13 is of the usual type having a metallic tubular casing 23 the lower portion 24 of which is screw-threaded to fit the nut 25 which engages the lower side of the main receptacle bottom 11. The said heater casing 23 is provided immediately above the bottom 11 with an outwardly extending annular flange 26 which is drawn down tight against a gasket 45 placed against the bottom 11 by the nut 25 to form a liquid tight joint about the aperture in the bottom. The upper and larger portion 27 of the heater casing above the bottom 11 is usually cylindrical in shape but near the flange 26 the heater casing is provided with a narrow zone 28 of slightly larger diameter than the main upper portion 27 of the casing. This enlarged zone at its upper edge slopes or curves to the lower end of the main upper portion 27 of the heater casing. The heater casing is provided with a top 29 preferably formed integral with the whole heater casing 23.

Turning now to the pump structure to which this invention more directly relates, it will be seen that the delivery stem or tube 16 is provided a little ways from its lower end with an outwardly extending shoulder 30 against the lower side of which fits the upper surface of the top 31 of the outer shell 18. In assembling the parts the outer shell 18 is first placed upon the lower projecting end of the stem 16 until the top 31 of said outer shell bears against the said flange 30, then there is placed upon the lower end of said stem the upwardly extending neck 32 centrally formed upon the top 33 of the inner cup-like shell 17. It will be understood that the neck 32 is of the height required to hold the top 31 of the outer shell and the top 33 of the inner shell the right distance apart to provide the desired dead air space for insulation at the top of said shells. After the parts are thus assembled the lower extremity of the tube or stem 16 is spun or crimped outwardly so as to hold both shells rigidly upon the said tube. The main portion of the inner shell is preferably formed as a cylindrical wall 34 corresponding to the general shape and size of the upwardly projecting part of the heater unit and with the said cylindrical portion 34 of such size that its lower end closely but detachably fits upon the said enlarged narrow zone 28 of the heater and preferably so that the extreme lower edge of said shell will rest down closely upon the heater flange 26. This engagement of these parts locates and holds the pump as a unit in the proper position in the receptacle and also in proper position relative to the heater.

Immediately above the said narrow enlarged zone 28 of the heater the inner surface of the inner shell 17 becomes spaced apart from the main cylindrical portion 27 of the heater due to said portion 27 being smaller than the zone 28 and smaller than the inner diameter of the shell 17. This arrangement provides the inner or heating chamber proper 35 between said inner shell and the heater.

Near the lower end of the inner shell 17 but just above the enlarged zone 28 of the heater the cylindrical wall of this shell is provided with one or more inlet ports or openings 36. As plainly shown in several of the drawings, these inlet ports or openings are tapered or curved to be smaller as the opening proceeds inward through the shell so as to produce a funnel-like or Venturi-like effect so that liquid readily passes inwardly through these inlet openings, but will pass outwardly therethrough much less readily or much less freely due to the constricted diameter of the inner end of the opening which has a relatively sharp or knife-like edge at the inner surface of the shell.

The outer shell 18 not only has its top 31 spaced from the top 33 of the inner shell, but the said wall or cylindrical portion 37 of this outer shell is spaced apart at all points a short distance from the enclosed cylindrical wall 34 of the inner shell. There is, however, a partition 42 extending from the outer shell 18 to the inner shell 17 closely above the line of the inlet openings 36. This partition is water-tight when the pump is assembled and results in forming a dead air space 43 above said partition 42 extending upwardly on the pump and to the neck portion 32 of the inner shell next to the stem or tube 16, but of course not connecting with the inside of said stem or tube. Below this partition 42 the portion of the outer shell depending below this partition 42 forms a baffle or apron 44 and with the adjacent part of the shell produces an impedient chamber 38. This baffle or apron being opposite the inlet openings 36 and relatively closely spaced opposite to such openings, operates as a baffle or impediment to backward movement of the liquid through said openings 36 since forceful or rapid movement of the liquid back through said inlet openings makes the liquid strike this baffle or apron and so interferes with any large amount of backward current, but does not prevent the regular proper amount of liquid passing inwardly through said openings 36 from the said impedient chamber 38 formed between the baffle 44 and the inner shell 17 below said partition 42.

It will be understood that the lower edge of the baffle 44 does not reach quite to the flange 26 of the heater, but is spaced therefrom a short distance, say about one-sixty-fourth of an inch. In other words, the lower edge of the outer shell is about this much shorter or higher than the lower edge of the inner shell 17 and thus provides a passageway 39 extending about the whole outer shell for liquid to enter from the main receptacle 14 into this intermediate chamber 38. As a further inducement to ready inward flow through this opening and as an impedient to backward flow through said opening, the lower edge 40 of said baffle is formed slanting or tapering or beveled so that it slopes downwardly as it extends inwardly as is plainly shown in several of the drawings. This results in the said annular inlet passageway 39 being funnel shaped or Venturi-like. The liquid can readily pass inwardly through such tapering passageway, but substantial movement outward is impeded or is further retarded by the sharp edge formed as an acute angle between the surface 40 and the adjacent inner surface of the apron or baffle 44.

The partition 42 extending from the inner shell 17 to the outer shell 18 may conveniently be formed as an outwardly extending bead or flange made upon the inner shell and reaching to the outer shell. When the two shells are assembled upon the stem the joint between the partition 42 and the outer shell and the joint between the two shells near the bottom of the stem are made tight by a tinning process.

Preferably the portion of the percolator opposite the lower slanting edge 40 of the apron 44 such as the outer part of the flange 26 on the heater will be slanted or curved upwardly as it extends inwardly so as to make the lower boundary of the passage 39 also funnel-shaped or Venturi-like in formation.

What I claim as new and desire to secure by Letters Patent is:

1. In an electric percolator the combination of a receptacle body, an electric heater projecting upward from the bottom of the receptacle, a shell of inverted cup-shaped form mounted over and closely surrounding said heater and having its lower end fitting said heater and forming above said fitting portion a thin annular liquid heating chamber and provided with inlet openings through the upright wall of said shell into the lower part of said chamber, a delivery stem leading upward from the top of the shell and an apron outside said shell projecting outwardly from said shell above said inlet openings therethrough and then extending downwardly and closely spaced from the upright wall of the shell and terminating close to the adjacent part of the percolator and leaving an inlet port below the apron, the lower edge of said apron being slanted inwardly as it extends downwardly to form an easy entrance and a difficult exit at the said inlet port below the apron.

2. In an electric percolator the combination of a receptacle body, an electric heater projecting upward from the bottom of the receptacle, a shell of inverted cup-shaped form mounted over and closely surrounding said heater and having its lower end fitting said heater and forming above said fitting portion a thin annular liquid heating chamber and provided with inlet openings through the upright wall of said shell into the lower part of said chamber, said openings being tapered to be smaller at the inner side of said shell, a delivery stem leading upward from the top of the shell and an apron outside said shell projecting outwardly from said shell above said inlet openings therethrough and then extending downwardly and closely spaced from the upright wall of the shell and terminating close to the adjacent part of the percolator and leaving an inlet port below the apron, the lower edge of said apron being slanted inwardly as it extends downwardly to form an easy entrance and a difficult exit at the said inlet port below the apron.

3. In an electric percolator the combination of a receptacle body, an electric heater projecting upwardly from the bottom of the receptacle, an inner shell of inverted cup-shaped form mounted over and closely surrounding said heater and having its lower end fitting said heater to form a liquid heating chamber therebetween and provided with inlet openings through the wall of said inner shell into said chamber, a delivery stem smaller than the inner shell and leading upward from the top of the inner shell, an outer shell spaced outwardly from the inner shell and means forming a tight joint between said shells about said stem and means including a ring forming a tight joint between the said walls of said shells closely above the said inlet openings, the lower part of said outer shell extending downwardly past and spaced closely from said inlet openings and forming a baffle horizontally opposite the heater to impede backward flow through the inlet openings, the lower edge of said outer shell being close to the adjacent part of the percolator to provide a narrow inlet port past said outer shell, the lower edge of said outer shell being slanted inwardly as it extends downwardly to form an easy entrance and a difficult exit at said inlet port.

4. An electric percolator comprising a liquid receptacle, an electric heater mounted in the bottom of said receptacle and projecting up thereinto and a pump consisting of an inverted cup mounted over said heater and having its bottom closely fitting the heater at the bottom of the receptacle but thereabove spaced slightly from the heater and forming an annular heating chamber about and over the heater, said cup having inlet openings adjacent the bottom of the heating chamber, a discharge pipe connected to and projecting up from the top of said cup and a second cup larger in diameter than the first cup and mounted over said first cup, its walls being spaced therefrom and extending down below said inlet openings and forming a baffle to obstruct back flow from the heating chamber out through the inlet openings but permitting inflow through said openings, the bottom of said larger cup being close to the adjacent portion of the percolator and slanting inwardly as it extends down whereby inward flow is facilitated and outward flow is impeded.

5. For use in an electric percolator having a liquid receptacle and an electric heater mounted in the bottom of the receptacle and projecting up thereinto, a pump consisting of an inverted cup mounted over said heater and having its bottom closely fitting the heater at the bottom of the receptacle but thereabove spaced slightly from the heater and forming an annular heating chamber about and over the heater, said cup having inlet openings adjacent the bottom of the heating chamber, a discharge pipe connected to and projecting up from the top of said cup and a second cup larger in diameter than the first cup and mounted over said first cup, its walls being spaced therefrom and extending down below said inlet openings and forming a baffle to obstruct back flow from the heating chamber out through the inlet openings but permitting inflow through said openings, the bottom of said larger cup being close to the adjacent portion of the percolator and slanting inwardly as it extends down whereby inward flow is facilitated and outward flow is impeded.

MOSES G. HUBBARD.